Jan. 11, 1966     W. H. SCHYMIK     3,229,058
CUBICLE UNITARY MOLDING FOR UPPER AND LOWER TERMINAL ASSEMBLY
AND CURRENT TRANSFORMERS
Filed Dec. 22, 1961     3 Sheets-Sheet 1

INVENTOR.
WALTER H. SCHYMIK
BY
OSTROLENK, FABER, GERB & SOFFEN
ATTORNEYS

Jan. 11, 1966 W. H. SCHYMIK 3,229,058
CUBICLE UNITARY MOLDING FOR UPPER AND LOWER TERMINAL ASSEMBLY
AND CURRENT TRANSFORMERS
Filed Dec. 22, 1961 3 Sheets-Sheet 2
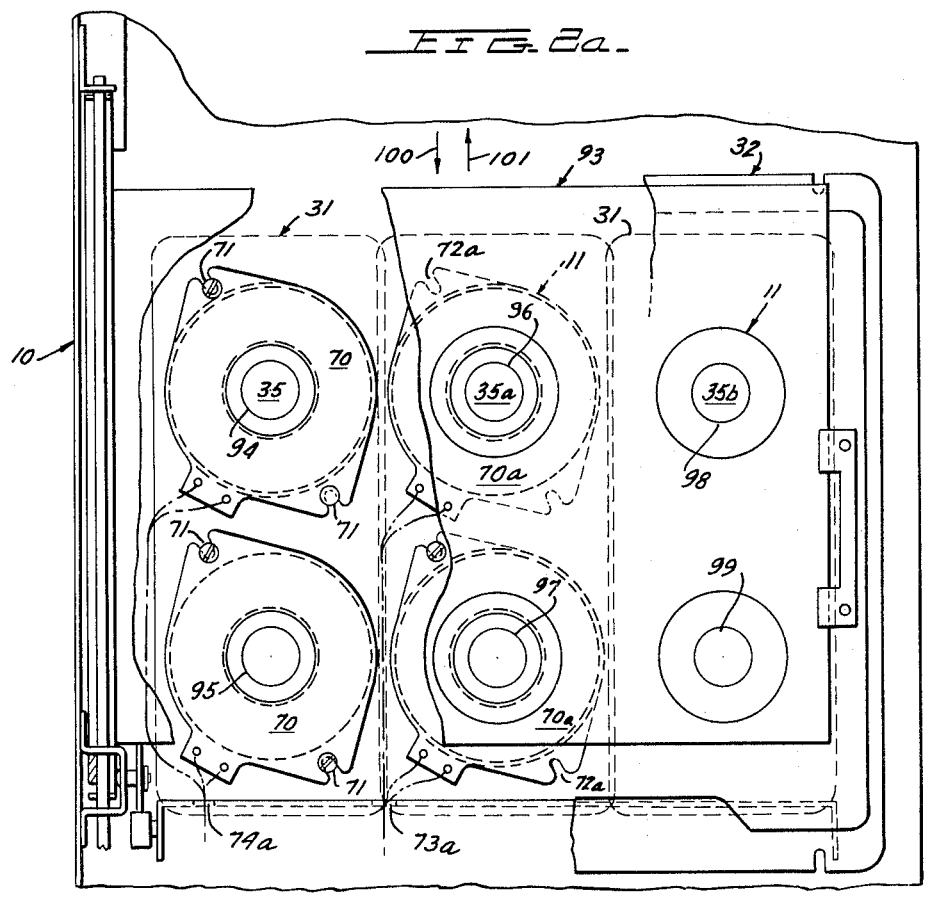
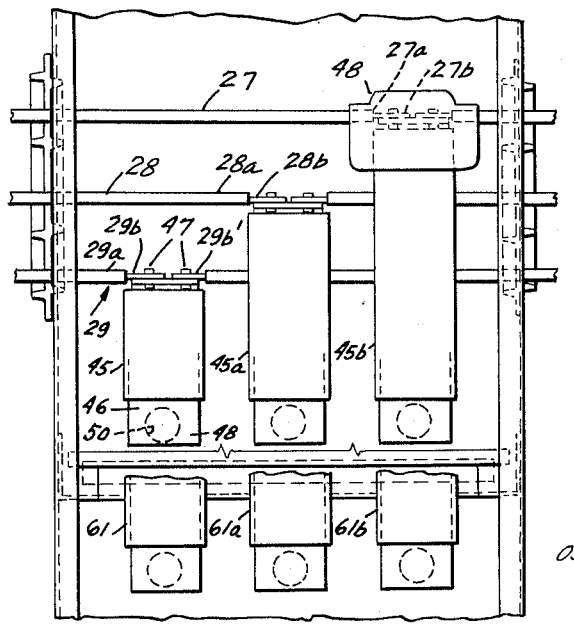
INVENTOR.
WALTER H. SCHYMIK
BY
OSTROLENK, FABER, GERB & SOFFEN
ATTORNEYS

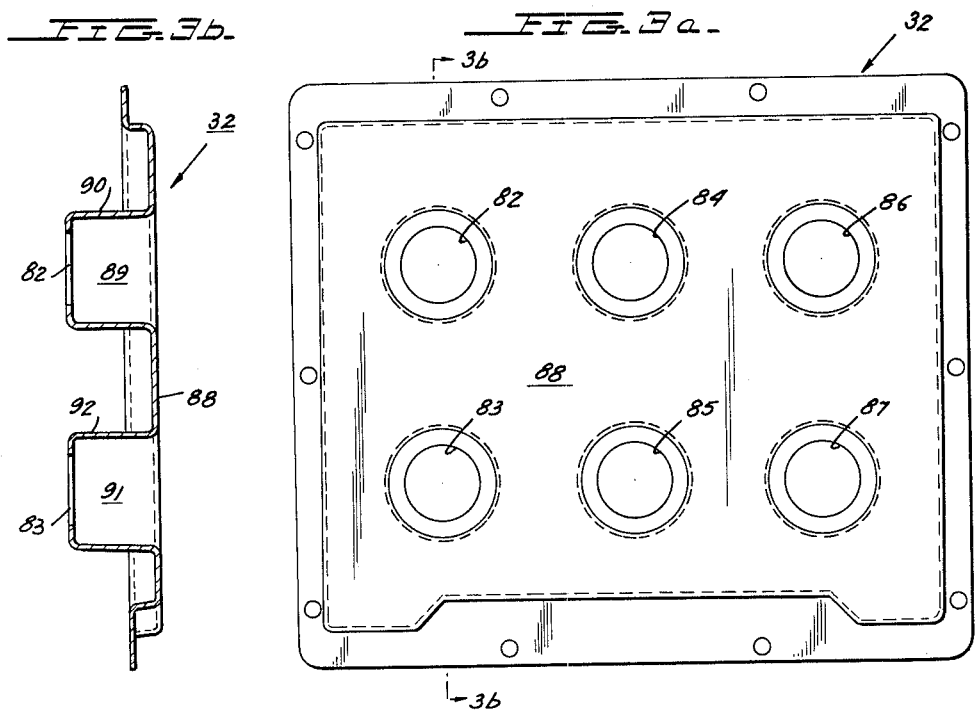
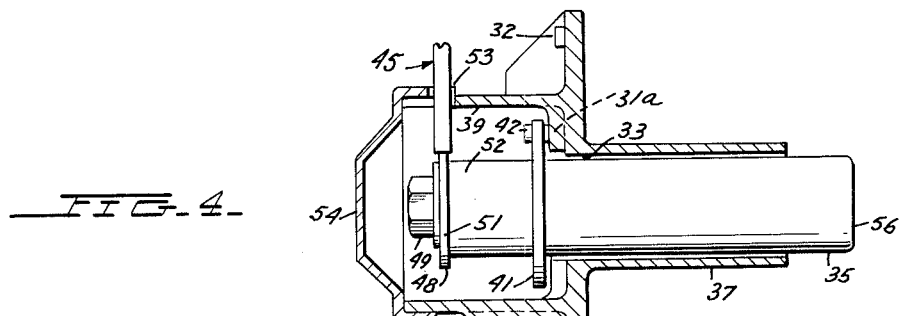
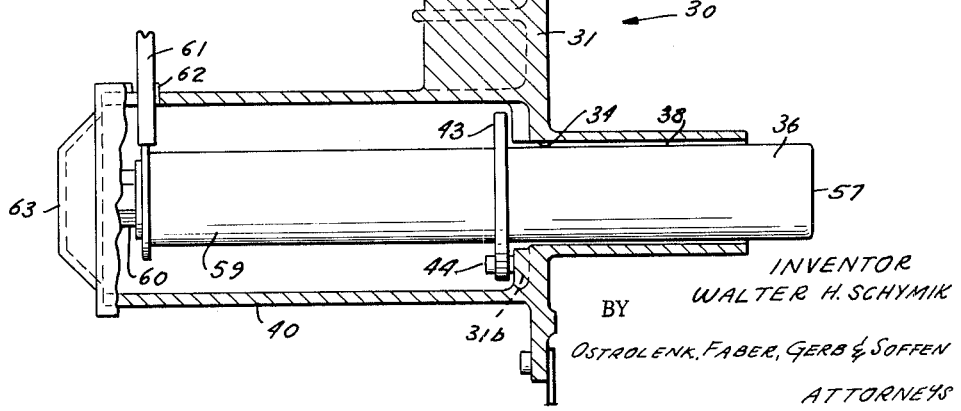

United States Patent Office 3,229,058
Patented Jan. 11, 1966

3,229,058
CUBICLE UNITARY MOLDING FOR UPPER AND LOWER TERMINAL ASSEMBLY AND CURRENT TRANSFORMERS
Walter H. Schymik, Oreland, Pa., assignor to I-T-E Circuit Breaker Company, Philadelphia, Pa., a corporation of Pennsylvania
Filed Dec. 22, 1961, Ser. No. 161,626
8 Claims. (Cl. 200—50.15)

This invention relates to circuit breakers and more particularly to a unitary insulating molding for circuit breaker enclosures with are so designed as to provide rigid support for the disconnect terminals; provide maximum electrical protection between poles and prevent undesirable gases emanating from one pole to reach any other pole within the breaker enclosure. High capacity circuit breakers of the removable or truck type find widespread use throughout the power transmission field. Circuit breaker equipment of this type is comprised of metal clad enclosure structures containing bus bars, cable connections and one or more truck or withdrawal type circuit breakers. Suitable barriers are provided within the enclosure in order to form independent instrument, breaker, main bus and load bus compartments where each compartment is isolated from the others.

The particular barrier employed to separate the main bus, breaker and load bus compartments is so arranged as to secure the male terminals which are connected to the main bus and load bus lines respectively at one of their ends and to removably engage the primary disconnects of the truck type circuit breaker. This barrier must be of ample strength to support the male terminals extending therethrough, insulate the terminals each from the other and isolate gases formed at any of the terminals and the remaining terminals and from the other compartments of the enclosure.

The unitary molding of this invention is so designed as to provide all these features and to further provide a mounting for current transformers to enable the transformers to be installed or removed from the front of the switch gear enclosure with relative ease.

The unitary molding assembly is comprised of a first insulating member having first and second apertures for receiving the switchboard male terminals. First and second annular projections which are co-linear with the first and second apertures respectively extend from the first member in the direction of the main bus and load bus compartments for enclosing the connections between the main bus and the first male terminal and the load bus and the second annular male terminals respectively. Removably mounted insulating caps are placed over each annular projection in order to completely insulate the connections housed therein.

The unitary molding is provided with appropriate apertures for securing the molded member to the barrier member which separates the breaker compartment from the main bus and load bus compartments. Threaded apertures are provided within the annular projections for securing the male terminals to the first member to provide sturdy support therefor.

Third and fourth annular projections coaxial with the first and second annular projections respectively are provided on the opposite face of the first member which projections extend in the direction of the circuit breaker compartment. The third and fourth projections provide the dual functions of affording support to the male terminals to prevent any movement transverse to the longitudinal axis of the male terminals and further to position the male terminals for engagement with the primary disconnects of the truck-type circuit breaker. The second function which the third and fourth annular projections perform is that of providing a convenient removable mounting for current transformers providing adequate support for transformers positioned thereupon while at the same time making the transformers easily removable from the front of the switch board enclosure.

The male terminal mounting assembly further includes a unitary molded member having first and second substantially annular recesses. An aperture is provided at the base of each recess. The second molded member is secured to the compartment barrier which separates the breaker compartment from the main bus and load bus compartments so that the apertures of the second molded member are colinear with the apertures of the first molded member respectively. The depth of the recesses are such that the male terminals extending through the first and second apertures of the second member do not extend the entire length of the recesses. The first and second recesses or pockets are so designed as to act as the enclosure means for the connection between the first and second male terminals and the first and second primary disconnects of the cooperating truck type circuit breaker. This arrangement provides complete electrical insulation and physical isolation between the first and second male terminals and further prevents loose or damaged parts of the circuit breaker or the switchboard enclosure from falling upon the male terminals thereby preventing any possible short circuit therein.

A shutter assembly is positioned between the second molded member and the truck type circuit breaker. The shutter assembly is operated under control of the truck-type circuit breaker so that the apertures provided in the shutter are aligned with the first and second recesses in the second molded member upon insertion of the truck type breaker into the breaker compartment. The shutter member is adapted to move longitudinally with respect to the second member upon withdrawal of the circuit breaker so that the first and second recesses of the second member are covered by the shutter when the truck type circuit breaker is removed from the circuit breaker compartment in order to prevent any accidental contact with the male terminals therein.

If it is desired to remove the current transformers positioned around the third and fourth annular projections of the first molded member this may be done simply by removing the shutter member and the second molded member and the second molded member and sliding the current transformers off of the annular projections.

It is therefore one object of this invention to provide a unitary molded assembly for drawout type switchgear wherein the molded assembly is designed so as to isolate the circuit breaker compartment from the bus compartments.

Another object of this invention is to provide a molded assembly for drawout-type switchgear which is designed to position and secure the upper and lower male terminals respectively of the switchgear compartment and to isolate the breaker compartment from the bus compartments.

Another object of my invention is to provide a molded assembly for draw-out type switchgear having a novel arrangement for mounting current transformers thereto.

Still another object of my invention is to provide a molded assembly for draw-out type switchgear having a molded member designed to prevent collection of undesirable gases in the region between the upper and lower male terminals positioned therethrough.

Another object of my invention is to provide a draw-out type switchgear arrangement having a novel molded assembly which prevents loose or broken objects within the circuit breaker compartment from falling upon the male terminals resulting in a development of a short circuit condition.

Another object of this invention is to provide a molded assembly for draw-out type switchgear which is so arranged as to permit removal of current transformers therefrom at the same time that the connections between the upper and lower male terminals with the main and load bus conductors respectively are being inspected or repaired.

These and other objects of this invention will become apparent from the following description and drawings in which:

FIGURE 2a is a front view of the lower portion of the draw-out type switchgear arrangement shown in FIGURE 1 looking through the front compartment door of the switchboard enclosure.

FIGURE 2b is a rear view of the lower portion of the switchgear of FIGURE 1.

FIGURES 3a and 3b are top and sectional plan views respectively, of the barrier molding member shown in FIGURES 1 and 2.

FIGURE 4 is an enlarged cross-sectional view of the cubicle molded assembly of FIGURE 1.

Figure 1:
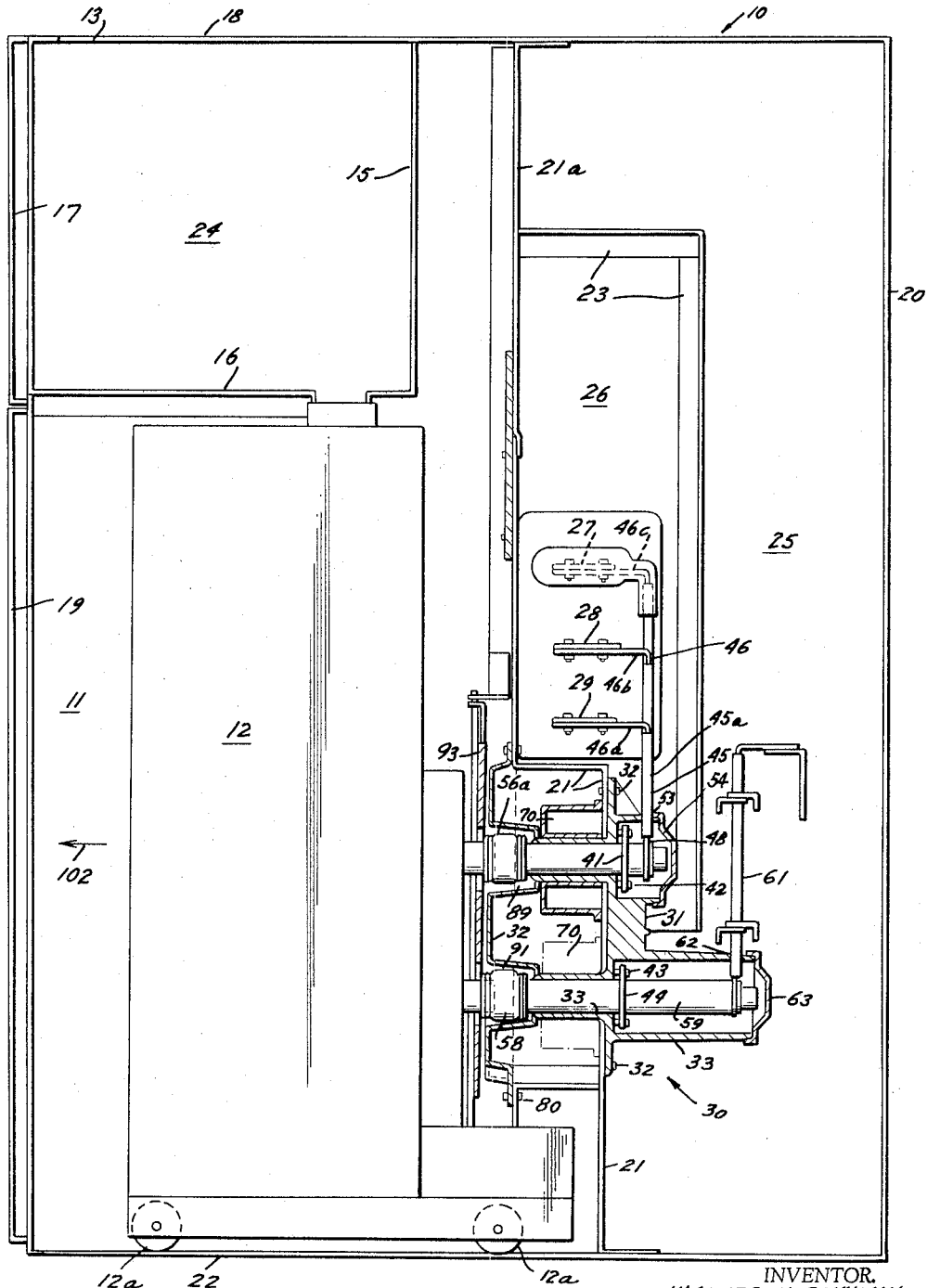
FIGURE 1 is a side view partially in cross-section of a draw-out type switchgear arrangement employing a cubicle molded assembly of this invention.

Referring now to the drawings, FIGURES 1 and 2 show a substantially rectangular metal-clad switchboard structure 10 containing a truck or withdrawal type circuit breaker 12 which is housed in the breaker compartment 11 provided in the cubicle 13. Barriers 15, 16, and 21, together with top cover 18 and floor member 22 of cubicle 13 define the breaker compartment 11. The door 19 of cubicle 13 is arranged in a hinged manner at one of its sides to enable drawout breaker structure 12, which is mounted to roll on wheels 12a, to be drawn into or out of breaker compartment 11.

An instrument compartment 24 defined by barriers 15, 16, and roof 18 of cubicle 13 is provided for the mounting of relays, meters and so forth for the purpose of monitoring the switchgear equipment contained therein. A door 17 is provided to permit free access to instrument compartment 24 for inspection or maintenance purposes.

The load bus compartment 25 which is defined by the barriers 23, upper barrier 21a, roof 18, floor 22, and rear wall 20 is provided for the housing of outgoing cable connections. The main bus compartment 26 which is defined by barrier 21 and 23 houses the main bus structures 27, 28 and 29, so as to isolate the source buses from the other compartments. It should be noted that although the drawout switchgear arrangement of the figures portrays a three phase system which includes buses 27, 28, and 29 for each of the three phases, it should be understood that the cubicle molded assembly does not depend upon a three phase system for its novelty, and may be employed in switchgear arrangements having a greater or lesser number of phases.

Suitable apertures are provided in barrier 21 of cubicle 13 to facilitate the mounting of cubicle molded assembly 30 which is comprised of a first molded member or bushing 31 (see FIGURE 4) and a second barrier member 32 (see FIGURES 3a and 3b). The cubicle molded assembly 30 cooperates with the barrier plate 21 in order to isolate the breaker 11, main bus 26, and load bus 25 compartments, each from the other, in a manner to be more fully described.

First molded member 31 is a secured to barrier plate 21 by suitable fastening means 32 which threadedly engage suitable apertures (not shown) in the molded member 31 and the barrier plate 21. Upper and lower apertures 33 and 34 respectively are provided in bushing 31 for receiving the upper 35 and lower 36 male terminals of the switchboard cubicle 13.

Upper and lower tubular projections 37 and 38 respectively, which are integral with the bushing member 31 extend from the body of the bushing member 31 in the direction of the breaker compartment 11. The tubular extensions or collars 37 and 38 are arranged so as to be coaxial with the apertures 33 and 34 of bushing 31. Upper and lower tubular extensions or collars 39 and 40 are provided on the opposite face of bushing member 31 so as to extend in the direction of main bus and load bus compartments 26 and 25 respectively. One such bushing 31 is provided for each phase as can clearly be seen in FIGURE 2a so that a description of only one such bushing is set forth herein since all bushings are identical. The upper male terminal 35 is provided with an integral ring member 41. Suitable apertures (not shown) are provided in ring 41 and in ledge 31a of bushing 31 for receiving fastening means 42 so as to secure upper male terminal 35 to bushing 31. In a like manner, lower male terminal 36 is provided with an integral ring 43 having suitable apertures cooperating with ledge 31b of bushing 31 for receipt of fastening means 44 so as to secure lower male terminal 36 to bushing 31.

The incoming main buses 27, 28 and 29 (see FIGURES 1 and 2b) which extend through the main bus compartment 26 of cubical 13 are each connected to the upper male terminals 35, 35a, and 35b (see FIGURE 2a) respectively, by means of risers 45, 45a, and 45b respectively. Since each of the connections for the three phases are identical, only the connection of main bus 29 with male terminal 35 will be described herein.

The main bus 29 consists of a conductive member 29b covered by suitable insulation 29a. The main bus 29 as shown in FIGURE 2b has its conductor member 29b and 29b' bared of insulation and positioned so that conductive portion 29b' lies adjacent conductor portion 29b for securement with riser member 45. Suitable insulation 45d is provided on riser 45 in order to prevent accidental contact with the enclosed conductor 46. The flanged portion 46a (see FIGURE 1) of conductor 46 is positioned beneath exposed conductors 29d and 29d' so that suitable apertures (not shown) provided in member 29b and 29b' and 46 cooperate to receive fastening means 47.

Fastening means 47 engaging the suitable apertures provided in conductors 29b, 29b' and 46 secure the lap-joint assembly. A bus joint cover 48 formed of an insulating material completely encloses the lap joint of each of the three phases. The bus joint covers are easily removable so as to permit inspection and/or maintenance of the bus connections housed therein.

Lower end 48 of the riser member conductor 46 is secured to the end 51 of upper male terminal 35 by the washer and bolt assembly 49. Aperture 50 provided at the lower end 48 of conductor 46 engages the end 52 of upper male terminal 35, so as to be sandwiched between the washer and bolt assembly 49 and the edge 51 of upper male terminal 35. The riser member 45 passes through an aperture 53 provided in collar 39. The opening in collar 39 is enclosed by a cap 54 which cooperates with the collar 39 to completely enclose the connection contained therein. Cap 54 is easily removable for inspection of the bolted connection.

The opposite end of upper male terminal 35 extends through tubular projection 37 so that the end 56 of male terminal 35 extends beyond the edge of collar 37 so as to be slidably engageable with the primary disconnect assembly 56a which extends from drawout breaker 12.

Tip 57 of lower male terminal 36 extends beyond the end of collar 38 in a like manner so as to be slidably engaged by the lower primary disconnect 58 extending from circuit breaker structure 12. The opposite end 59 of lower male terminal 36 which is enclosed within collar 40 of bushing 31 is connected to a riser member 61 by fastening means 60 in a manner similar to that of upper male terminal 35. The riser 61 passes through a slot 62 provided in collar 40. A removable cap 63 encloses the bolted connection between risers 61 and lower male terminal 35 so as to prevent any accidental contact with this connection such as shown in 2b. Three risers 61, 61a, and 61b are provided for each of the three phases for connection to suitable load means (not shown).

Current transformers 70 (see FIGURES 1 and 2a) are mounted around the front projecting collars 37 and 38 respectively. The current transformers are secured by fastening means 71 which engage slots 72 in the current transformer housings and suitable apertures in the molded bushing 31. Secondary leads 73 of each current transformer are extended downward and out of the metal frame of barrier 21 by means of apertures 74a.

Unitary cover member 32 is secured to barrier means 21 and is positioned within the breaker compartment 11 so as to lie between circuit breaker 12 and bushing 31. The cover member 32 is secured to the barrier 21 by fastening means 80. Cover member 32 is provided with apertures 82 through 87 to permit the male terminals 35 through 35b and 36 through 36b to be extended therethrough. Since the structure of the cover member 32 is identical for the upper and lower male terminals of each phase of the circuit breaker structure, the apertures of only one such phase is described herein.

Aperture 82 (see FIGURES 3a and 3b) provided in cover member 32 is recessed from the main body 88 of cover member 32 so as to form a pocket 89 surrounded by the annular wall 90. Likewise, aperture 83 is recessed from the main body 88 so as to form a pocket 91 surrounded by the annular wall 92. The apertures 82 and 83 are aligned so as to be coaxial with the apertures 33 and 34 respectively, of bushing 31.

A shutter assembly comprised of the shutter member 93 shown in FIGURES 1 and 2a is positioned between barrier molding 32 and truck-type circuit breaker 12. The shutter assembly is of the type described in U.S. Patent 2,894,085 entitled "Shutter Operating Mechanism," issued July 7, 1959 to G. A. Wilson and assigned to the assignee of the instant invention. Since the shutter assembly lends no novelty to the instant invention, it should be understood that the shutter assembly employed herein may be of a type other than that described in the aforementioned U.S. patent which is herein referred to as one exemplary embodiment for a shutter assembly. The basic operation of the shutter assembly is as follows.

The shutter member 93 is provided with 6 apertures 94 through 99 as shown in FIGURE 2a which, with the drawout type of breaker 12, is in the connected position as shown in FIGURE 1, and is positioned so that the apertures 94 through 99 are in alignment with the apertures 33 through 33b and 34 through 34b (only 33 and 34 being shown in FIGURE 4) of the bushing member 31 so that the circuit breaker disconnects 57a and 58 enter into engagement with the upper and lower male terminals such as male terminals 35 and 36 in the manner shown in FIGURE 1. When the circuit breaker 12 is drawn out of cubicle 13 in the direction shown by arrow 102 in FIGURE 1, the shutter assembly is adapted so as to move the shutter member 93 vertically downward as shown by arrow 100 in FIGURE 2a, so that the apertures 94 through 99 of the shutter member are displaced longitudinally with respect to the apertures 34 and 35 of each bushing member 31 through 31b thereby, completely covering each upper 35 and lower 36 male terminal to prevent either accidental or intentional contact with these terminals by an operator or any other object.

With the breaker 12 in the position shown in FIGURE 1, the pockets 89 and 91 formed by the barrier molding 32 completely isolate the upper male terminal 35 from the lower male terminal 36 so as to prevent the collection of undesirable gases therebetween. The shutter member 93 and the body portion 88 of barrier molding 32 which lie between the upper and lower terminals 35 and 36 provide excellent insulation between upper and lower terminals 35 and 36, which cooperate with the pocket arrangements 89 and 91 to prevent the occurrence of any arcing between these terminals.

With the circuit breaker 12 removed from the breaker compartment 11, shutter 93 moves vertically downward as shown by arrow 100 in FIGURE 2a so that in this position the pockets 89 and 91 which are completely enclosed due to the movement of the shutter member 93 in addition to preventing contact with upper and lower male terminals 35 and 36, further act to prevent any operator or object from making either accidental or intentional contact with the upper and lower male terminals, also prevent collection of undesirable gases between the terminals thereby preventing the occurrence of any undesirable arcing.

If any of the fingers of the primary disconnect 57a become loose and drop off the arrangement of the barrier molding 32 is such that the fallen object is prevented from coming into contact with the lower male terminal. This is likewise true when the breaker 12 is removed from the breaker compartment 11 and also when the breaker 12 is in the process of being removed, even though the fallen object may drop out of the pocket 89, since it cannot make contact with the terminal 36 due to a configuration of pocket 91.

The barrier molding 32 and the bushings 31 in addition to providing adequate structural support for the upper and lower male terminals and preventing any arcing between these terminals also provide complete isolation between the breaker main bus and load bus compartments 11, 26, and 25 respectively.

Although I have described preferred embodiments of my novel invention, many variations and modifications will now be obvious to those skilled in the art, and I prefer therefore to be limited not by the specific disclosure herein but only by the appended claims.

The embodiments of the invention in which an exclusive privilege or property is claimed are defined as follows:

1. A terminal mounting assembly for use in cubicles housing drawout type circuit breakers comprising upper and lower male terminals; a first unitary molding having first and second apertures for receiving upper and lower male terminals respectively, first and second collars coaxial with said first and second apertures, respectively extending from one face of said first unitary molding for restraining said male terminals from movement transverse to their longitudinal axes; third and fourth collars coaxial with said first and second apertures respectively, extending from the face of said moldings opposite said first face for securing said upper and lower male terminals, first and second collars extending towards the circuit breaker, said unitary molding being formed of an insulating material, said first and second collars including means for positioning and securing current transformers in coaxial alignment with said upper and lower male terminals.

2. A terminal mounting assembly for use in cubicles housing drawout type circuit breakers comprising upper and lower male terminals; a first unitary molding having first and second apertures for receiving upper and lower male terminals respectively, first and second collars coaxial with said first and second apertures, respectively extending from one face of said first unitary molding for restraining said male terminals for movement transverse to their longitudinal axes; third and fourth collars coaxial with said first and second apertures respectively, extending from the face of said moldings opposite said first face for securing said upper and lower male terminals, first and second collars extending towards the circuit breaker, said unitary molding being formed of an insulating material, said third and fourth collars each having a slot for receiving conductors connectible to said upper and lower male terminals; said slots being transverse to the longitudinal axes of said third and fourth collars.

3. A terminal mounting assembly for use in cubicles housing drawout type circuit breakers comprising upper and lower male terminals; a first unitary molding having first and second apertures for receiving upper and lower male terminals respectively, first and second collars coaxial with said first and second apertures, respectively extending from one face of said first unitary molding for restraining said male terminals for movement transverse to their longitudinal axes; third and fourth collars coaxial with said first and second apertures respectively, extending from the face of said moldings opposite said first face for securing said upper and lower male terminals, first and second collars extending towards the circuit breaker, said unitary molding being formed of an insulating material, said third and fourth collars each having a slot for receiving conductors connectible to said upper and lower male terminals; said slots being transverse to the longitudinal axes of said third and fourth collars, first and second removable insulating cover means for sealing the openings of said third and fourth collars to completely isolate the connections housed therein.

4. A terminal mounting assembly for use in cubicles housing drawout type circuit breakers comprising upper and lower male terminals; a first unitary molding having first and second apertures for receiving upper and lower male terminals respectively, first and second collars coaxial with said first and second apertures, respectively extending from one face of said first unitary molding for restraining said male terminals from movement transverse to their longitudinal axes; third and fourth collars coaxial with said first and second apertures respectively, extending from the face of said moldings opposite said first face for securing said upper and lower male terminals, first and second collars extending towards the circuit breaker, a barrier molding having fifth and sixth apertures positioned substantially parallel to and adjacent the ends of said one face of said first molding; said barrier molding being adapted to isolate said upper and lower terminals, said barrier molding fifth and sixth apertures positioned coaxial to said first and second apertures respectively; fifth and sixth tubular projections in said barrier molding coaxial with said fifth and sixth apertures and extending towards said first unitary molding forming first and second pockets surrounding the first ends of said male terminals connectible with the associated circuit breaker; said pockets preventing undesirable gases to collect between the male terminals and preventing accidental contact with the first ends of said male terminals.

5. A terminal mounting assembly for housing multiphase drawout type circuit breakers comprising a plurality of first unitary moldings for each of said phases, each unitary molding having first and second apertures for receiving upper and lower male terminals respectively, first and second collars coaxial with said first and second apertures, respectively extending from one face of said first unitary molding for restraining said male terminals, from movement transverse to their longitudinal axes; third and fourth collars coaxial with said first and second apertures, respectively, extending from the face of said molding opposite said first face for securing said upper and lower male terminals, respectively to said molding, said first and second collars extending towards the circuit breaker, said unitary molding being formed of an insulating material, said first and second collars including means for positioning and securing current transformers in coaxial alignment with said upper and lower male terminals, said third and fourth collars each having a slot for receiving conductors connectible to said upper and lower male terminals; said slots being transverse to the longitudinal axes of said third and fourth collars.

6. A terminal mounting assembly for housing multiphase drawout type circuit breakers comprising a plurality of first unitary moldings for each of said phases, each unitary molding having first and second apertures for receiving upper and lower male terminals respectively, first and second collars coaxial with said first and second apertures, respectively extending from one face of said first unitary molding for restraining said male terminals, from movement transverse to their longitudinal axes; third and fourth collars coaxial with said first and second apertures, respectively, extending from the face of said molding opposite said first face for securing said upper and lower male terminals, respectively to said molding, said first and second collars extending towards the circuit breaker, said unitary molding being formed of an insulating material, said first and second collars being adaptable for positioning and securing current transformers with respect to said upper and lower male terminals, said third and fourth collars each having a slot for receiving conductors connectible to said upper and lower male terminals; said slots being transverse to the longitudinal axes of said third and fourth collars, first and second removable insulating cover means for sealing the openings of said third and fourth collars completely isolating the connections housed therein.

7. A terminal mounting assembly for housing multiphase drawout type circuit breakers comprising a plurality of first unitary moldings for each of said phases, upper and lower male terminals; each unitary molding having first and second apertures for receiving said upper and lower male terminals respectively, first and second collars coaxial with said first and second apertures, respectively extending from one face of said first unitary molding for restraining said male terminals from movement transverse to their longitudinal axes; third and fourth collars coaxial with said first and second apertures, respectively, extending from the face of said molding opposite said first face for securing said upper and lower male terminals, respectively to said molding, said first and second collars extending towards the circuit breaker, said unitary molding being formed of an insulating material, said first and second collars including means for positioning and securing current transformers with respect to said upper and lower male terminals, said third and fourth collars each having a slot for receiving conductors connectible to said upper and lower male terminals; said slots being transverse to the longitudinal axes of said third and fourth collars, first and second insulating cover means adapted to removably seal the openings of said third and fourth collars completely isolating the connections housed therein, a barrier molding having a plurality of pairs of apertures for the upper and lower male terminals of each of said phases positioned substantially parallel to and adjacent the ends of said one face of each of said first unitary moldings, said barrier molding isolating said upper and lower male terminals, each of said pairs of apertures positioned coaxial to the first and second apertures respectively of each of said first unitary moldings, each aperture pair having fifth and sixth tubular projections coaxial with their associated apertures and extending towards said first unitary moldings, forming first and second pockets for surrounding the first ends of said male terminals connectible with the associated circuit breaker; said pockets preventing undesirable gases from collecting between the male terminals and preventing accidental contact with the first ends of said male terminals.

8. A terminal mounting assembly for housing multiphase drawout type circuit breakers comprising a plurality of first unitary moldings for each of said phases, upper and lower male terminals; each unitary molding having first and second apertures for receiving said upper and lower male terminals respectively, first and second collars coaxial with said first and second apertures, respectively extending from one face of said first unitary molding for restraining said male terminals from movement transverse to their longitudinal axes; third and fourth collars coaxial with said first and second apertures, respectively, extending from the face of said molding opposite said first face for securing said upper and lower male terminals, respectively to said molding, said first and second collars extending towards the circuit breaker, said unitary molding being formed of an insulating material, said first and second collars including means for positioning and securing current transformers with respect to said upper and lower male terminals, said third and fourth collars each having a slot for receiving conductors connectible to said upper and lower male terminals; said slots being transverse to the longitudinal axes of said third and fourth collars, first and second insulating cover means adapted to removably seal the openings of said third and fourth collars completely isolating the connections housed therein, a barrier molding having a plurality of pairs of apertures for the upper and lower male terminals of each of said phases positioned substantially parallel to and adjacent the ends of said one face of each of said first unitary moldings, said barrier molding isolating said upper and lower male terminals, each of said pairs of apertures positioned coaxial to the first and second apertures respectively of each of said first unitary moldings, each aperture pair having fifth and sixth tubular projections coaxial with their associated apertures and extending towards said first unitary moldings, forming first and second pockets for surrounding the first ends of said male terminals connectible with the asso- ciated circuit breaker; said pockets preventing undesirable gases from collecting between the male terminals and preventing accidental contact with the first ends of said male terminals; said upper and lower male terminals each having a flange surrounding said terminal and intermediate the ends thereof; means for securing said flange to said unitary molding to prevent longitudial movement of said male terminals.

References Cited by the Examiner

UNITED STATES PATENTS

| | | | |
|---|---|---|---|
| 1,997,081 | 4/1935 | Reynolds | 339—89 |
| 2,894,085 | 7/1959 | Wilson | 200—50 |
| 3,015,756 | 1/1962 | Kreekon | 200—50 |

FOREIGN PATENTS 430,494  6/1935  Great Britain.

KATHLEEN H. CLAFFY, *Primary Examiner.*

BERNARD A. GILHEANY, *Examiner.*